(12) United States Patent
Mack et al.

(10) Patent No.: US 6,883,604 B2
(45) Date of Patent: Apr. 26, 2005

(54) SHAFT LOCKING COUPLINGS FOR SUBMERSIBLE PUMP ASSEMBLIES

(75) Inventors: John J. Mack, Tulsa, OK (US); Earl B. Brookbank, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/160,899

(22) Filed: Jun. 3, 2002

(65) Prior Publication Data

US 2002/0179305 A1 Dec. 5, 2002

Related U.S. Application Data

(60) Provisional application No. 60/296,014, filed on Jun. 5, 2001.

(51) Int. Cl.[7] ............................................. F04B 53/22
(52) U.S. Cl. ................... 166/105; 166/377; 403/359.5; 464/182
(58) Field of Search ................ 166/377, 107, 166/105; 403/300, 305, 359.5, 289; 464/182

(56) References Cited

U.S. PATENT DOCUMENTS

| | | | | |
|---|---|---|---|---|
| 317,154 A | * | 5/1885 | Lowrie | 403/182 |
| 502,686 A | * | 8/1893 | Tilton | 403/300 |
| 1,469,304 A | * | 10/1923 | Hughes | 403/305 |
| 2,161,501 A | * | 6/1939 | Blackmon | 403/328 |
| 2,829,503 A | * | 4/1958 | Hayes | 173/128 |
| 2,885,232 A | * | 5/1959 | Eberly | 403/202 |
| 3,588,154 A | * | 6/1971 | Voight | 403/300 |
| 3,832,076 A | * | 8/1974 | Gehrke | 403/359.5 |
| 5,318,375 A | * | 6/1994 | Entrup et al. | 403/359.5 |
| 5,501,542 A | * | 3/1996 | Hall, Sr. | 403/306 |
| 6,009,609 A | * | 1/2000 | Hanno | 29/401.1 |
| 6,390,200 B1 | * | 5/2002 | Allamon et al. | 166/376 |

FOREIGN PATENT DOCUMENTS

EP 339380 A1 * 11/1989 ............. F16D/1/02

* cited by examiner

Primary Examiner—David Bagnell
Assistant Examiner—Daniel P Stephenson
(74) Attorney, Agent, or Firm—Bracewell & Patterson, L.L.P.

(57) ABSTRACT

An electrical submersible pump assembly has first and second modular component sections, each of the sections having an outer housing and an inner shaft member. A coupling sleeve having a bore is disposed between the modular component sections and receives the shaft member of each of the component sections. The bore of the coupling sleeve and the shaft members having mating radial load transmitting shoulders for transmitting torque. An axial load transmitting shoulder is affixed to the shaft member of the first modular component section and located in the bore of the coupling sleeve. A locking element is carried by the shaft member of the second modular section and engages the axial load transmitting shoulder to secure the shaft members to one another for transferring axial tension from one of the shaft members to the other.

22 Claims, 13 Drawing Sheets

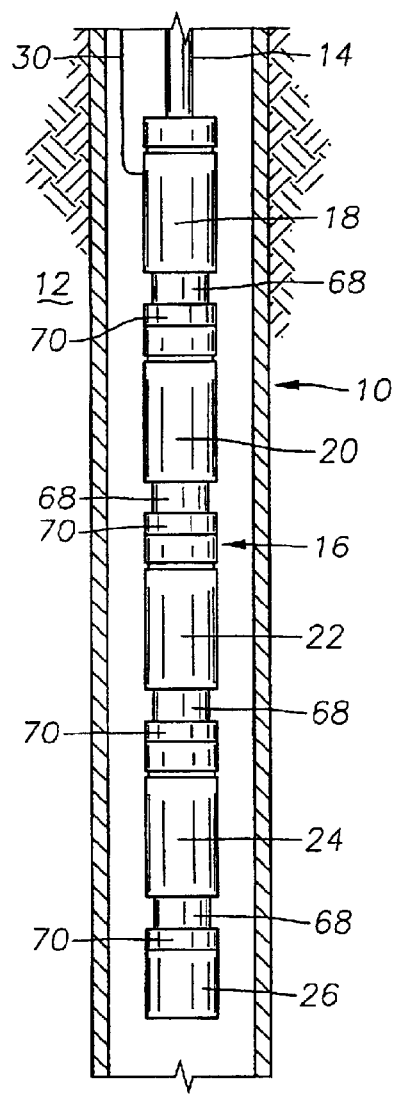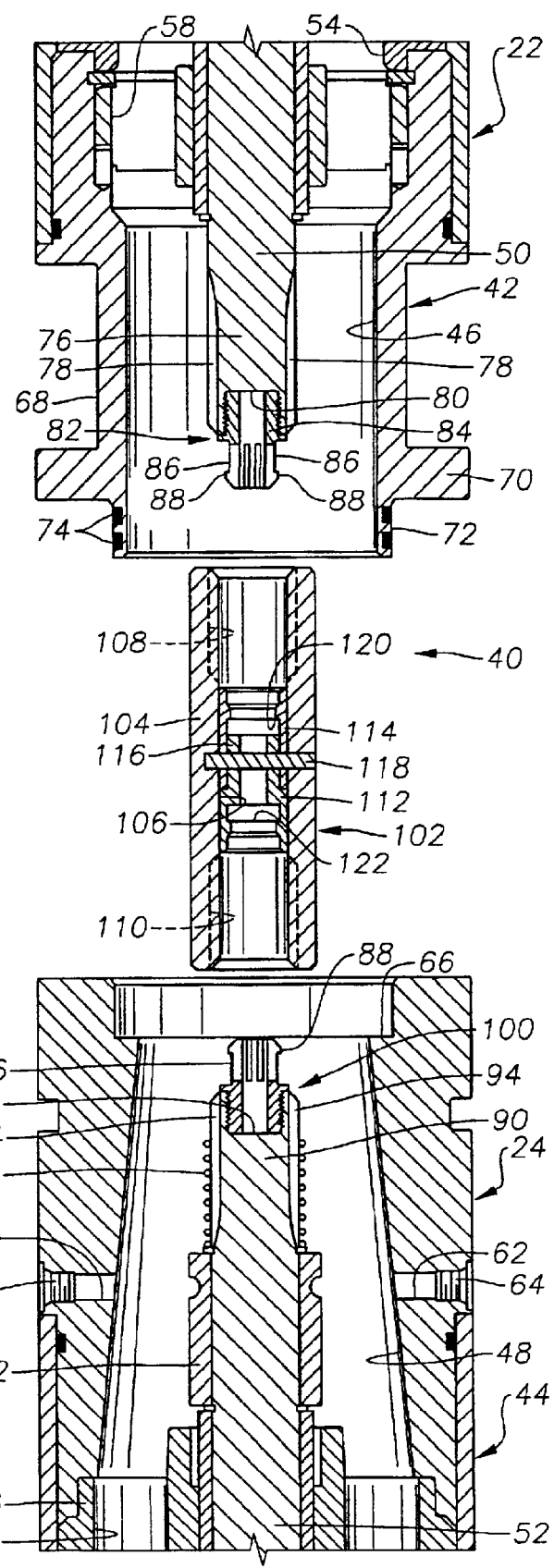

SHAFT LOCKING COUPLINGS FOR SUBMERSIBLE PUMP ASSEMBLIES

This application claims the provisional filing date of Jun. 5, 2001, Ser. No. 60/296,014.

BACKGROUND OF THE INVENTION

1. Field of the Invention

The invention relates to devices and techniques for coupling shafts and other portions of submersible pump assemblies and like components.

2. Description of the Related Art

Conventionally, electrical submersible pump ("ESP") assemblies have been made up of a series of interconnectable modular sections including one or more pump sections with an associated fluid intake, a motor section and a seal section. Each of these sections includes an outer radial housing and a radially interior shaft. At present, the shafts and their connections are designed so that they can primarily transmit a compression load. The shaft of each section is interconnected with the shaft of the adjacent section by straight splining. There are normally no securing members used that would resist pulling apart of the shafts. Placement of the shafts or shaft connections under tension loads will cause the connection to separate easily.

This sort of "compression only" connection between shaft members is permissible when a standard ESP configuration is used wherein the pump section(s) are located above the seal and motor sections. Thrust bearings in the seal and motor sections support the pump sections, and the shaft members are not placed in tension. When a "bottom intake" ESP configuration is used, however, the pump section(s) are located below the motor and seal sections in the wellbore. An expensive thrust bearing is required to support the ESP components.

Although it might be possible to simply pin or weld the shafts of adjacent ESP sections together, there is an operational problem with doing so. In practice, it is difficult to assemble and disassemble the pinned shafts since they reside within the housings. If the connection is welded, it is quite difficult to disassemble the sections after removal of the pump assembly from the wellbore.

It would be desirable to have methods and devices that overcome the problems of the prior art.

SUMMARY OF THE INVENTION

The invention provides methods and devices for interconnection of components within an electrical submersible pump assembly and the like. This interconnection may be between a seal section and a motor section, a motor section and a pump section, a pump section and a seal section and so forth. The shaft sections are interconnected to support compression loading as well as a predetermined amount of tension loading.

In addition, the shaft interconnection is formed to be releasable in a selective manner. In one embodiment, the interconnection between the shaft sections is released when a predetermined amount of tension is applied to the connection. In a first embodiment a shear pin or other shearable member is ruptured by application of a predetermined amount of tension loading. In a second described embodiment, the interconnection between adjacent shaft sections is handled by spherical locking elements or balls. The locking elements are released by axial movement of an actuator. In a third embodiment, the shafts of adjacent components are provided with axially-directed intermeshing fingers on the shaft members to secure the shaft members to each other for transfer of torsional forces. A fourth exemplary embodiment employs a snap ring connection to fixedly secure adjacent shaft members to one another. A fifth embodiment is also described that is similar in many respects to the second embodiment. In this embodiment, fluid pressure is used to move the actuator. A sixth embodiment employs a hub carried by one shaft end, the hub having an axial load transmitting shoulder. A latch member with resilient fingers is secured to the other shaft end.

BRIEF DESCRIPTION OF THE DRAWINGS

FIG. 1 is a side cross-sectional view of an exemplary electrical submersible pump assembly disposed within a well bore on production tubing.

FIG. 2 is a partially exploded, side cross-sectional view of a first exemplary connection assembly used for interconnecting the two pumps in the pump assembly depicted in FIG. 1.

DETAILED DESCRIPTION OF THE PREFERRED EMBODIMENTS

Figure 3:
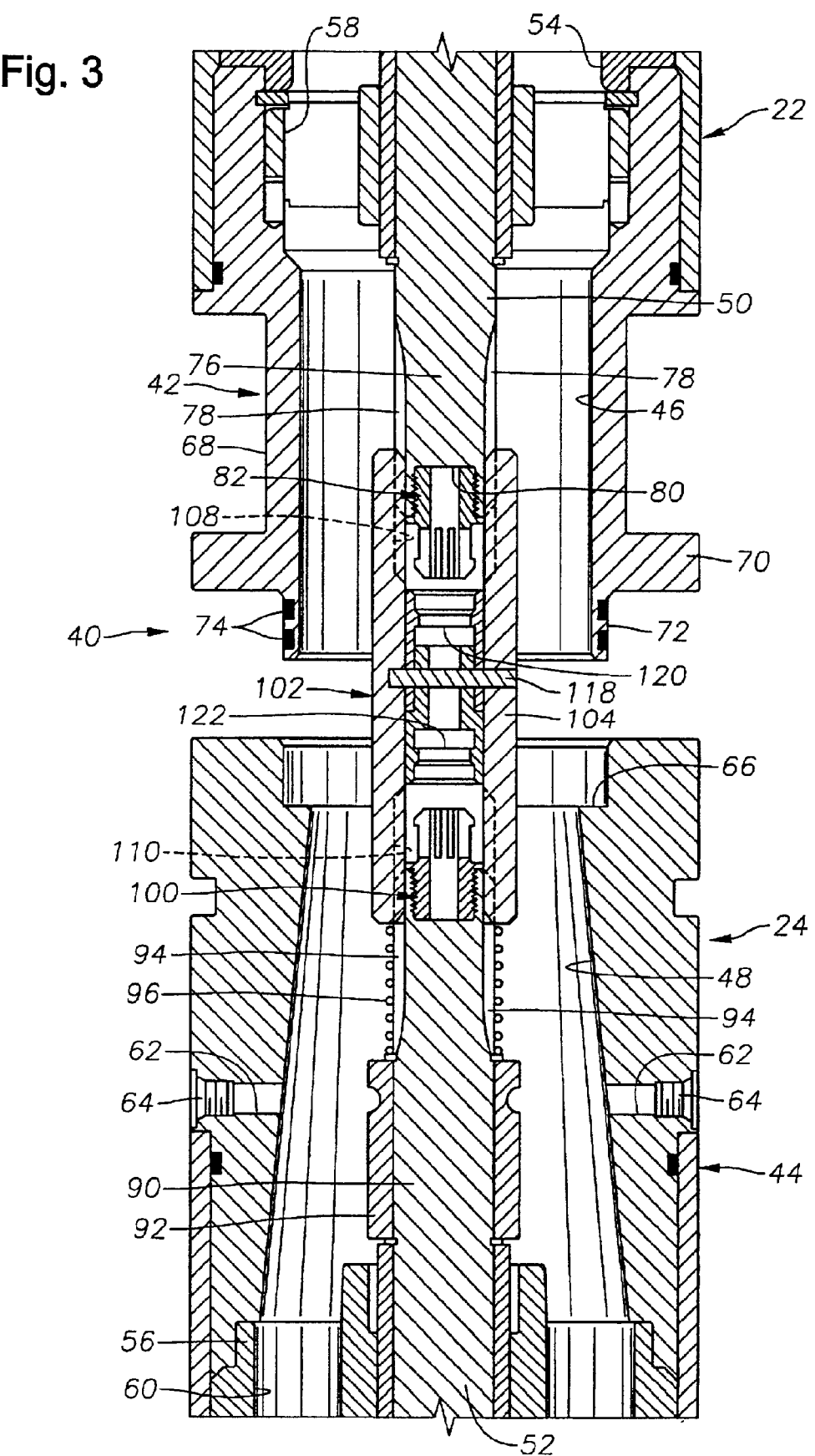
FIG. 3 is a side cross-sectional view of the components depicted in FIG. 2 with the adjacent shaft sections being moved toward interconnection with one another.

FIG. 1 represents an exemplary well bore 10 that has been drilled through earth 12 into a formation (not shown). The well bore 10 is a producing well and contains a string of production tubing, the lower end of which is shown at 14.

The production tubing has incorporated therein an electric submersible pump assembly, generally shown at 16. The pump assembly 16 is made up of a series of interconnected modular sections. In this case, there are a motor section 18, a seal section 20 and two pump sections 22, 24. The ESP assembly 16 is a reverse, or bottom intake pump assembly since the pump sections 22, 24 are located downhole from the motor and seal sections 18, 20. A fluid intake manifold 26 is interconnected to the lower pump section 24. The motor section 18 has a power cable 30 which extends from the motor section 18 to the surface (not shown) of the well 10.

FIG. 2 is representative of an exemplary connection assembly 40 used to form the interconnection between the two pump sections 22, 24. It should be understood, however, that the interconnection shown could also be that between the seal section 20 and the upper pump section 22 or the motor section 18 and the seal section 20, as the same principles of interconnection would apply since each of the devices listed includes a radially outer housing or body and a rotatable shaft member contained radially there within. The upper pump section 22 and the lower pump section 24 have the same construction. As can be seen in FIG. 2, each pump section 22, 24 includes a radially outer housing body 42, 44 that defines a longitudinal central chamber 46, 48 therein. A shaft member 50, 52 is secured by rotatable bearing 54, 56 within the central chamber 46 or 48 of each pump section 22, 24. Fluid flow paths 58, 60 permit fluid to flow through each bearing 54, 56. In each pump section 22, 24, a pair of fluid ports is disposed through the housing body. Fluid ports 62 are shown in the housing body 44 of the lower pump 24. These ports 62 are normally closed by caps 64.

The upper end of the housing body for each pump section 22, 24 defines an annular landing shoulder 66, one of which is shown on the lower pump section 24. The lower end of each housing body 42, 44 includes a reduced diameter portion 68, one of which is shown at the lower end of the upper pump section 22. Radially enlarged annular flange 70 is located immediately below the reduced diameter portion 68, while a reduced diameter seating portion 72 is located just beneath the flange 70. Annular elastomeric seals 74 are disposed upon the seating portion 72.

The upper shaft member 50 within the pump section 22 has a lower end portion 76 with a plurality of longitudinal splines 78 or the like formed therein. The lower end portion also defines an internally threaded blind bore 80 that retains a latching member 82 having external threads that engage the internal threading of the bore 80. The latching member 82 has a cylindrical base 84 with a plurality of fingers 86 extend axially outward therefrom. The fingers 86 are maintained in a spaced relation from one another about the circumference of the base 84. A radially outwardly projecting catch 88 is formed on the end of each finger 86. The fingers 86 can be flexed radially inwardly to a slight degree.

The upper end 90 of the shaft member 52 in the lower pump section 24 is constructed similarly, although with a few differences. A collar 92 surrounds the upper end 90 below longitudinal splines 94. Compressible spring 96 surrounds the upper end 90 proximate the splines 94. A blind bore 98 defined in the end 90 retains a latching member 100 that is identical to the latching member 82 described earlier. As a result, like reference numerals are used to designate the fingers and catches associated therewith.

A coupling sleeve 102 is shown in FIG. 2 apart from other components of the connection assembly 40. The coupling sleeve 102 includes an elongated tubular body 104 that defines a elongate passage 106 therein. The passage 106 has longitudinal splines 108, 110 scribed into each end of the body 104, the splines 108, 110 being complimentary in shape and size to interfit with the splines 78, 94, respectively, of the opposing shaft members 50, 52. A first inner hub member 112 and a second inner hub member 114 are disposed loosely within the passage 106 of the body 104. The first inner hub member 112 has a reduced diameter axially protruding forward portion 116. The second inner hub member 114 surrounds the protruding portion 116. Shear pin 118 is disposed through the walls of both the second inner hub member 114 and the protruding portion 116 of the first inner hub member 112, thereby securely interconnecting the two components. The shear pin 118 is a frangible member that is designed to fail (i.e., to shear) at a predetermined shear load. The first and second hub members 112, 114 each have internal annular shoulders 120, 122 that are shaped and sized to engage the catches 88 at the ends of the fingers 86 of each latching member 82, 100.

Figure 4:
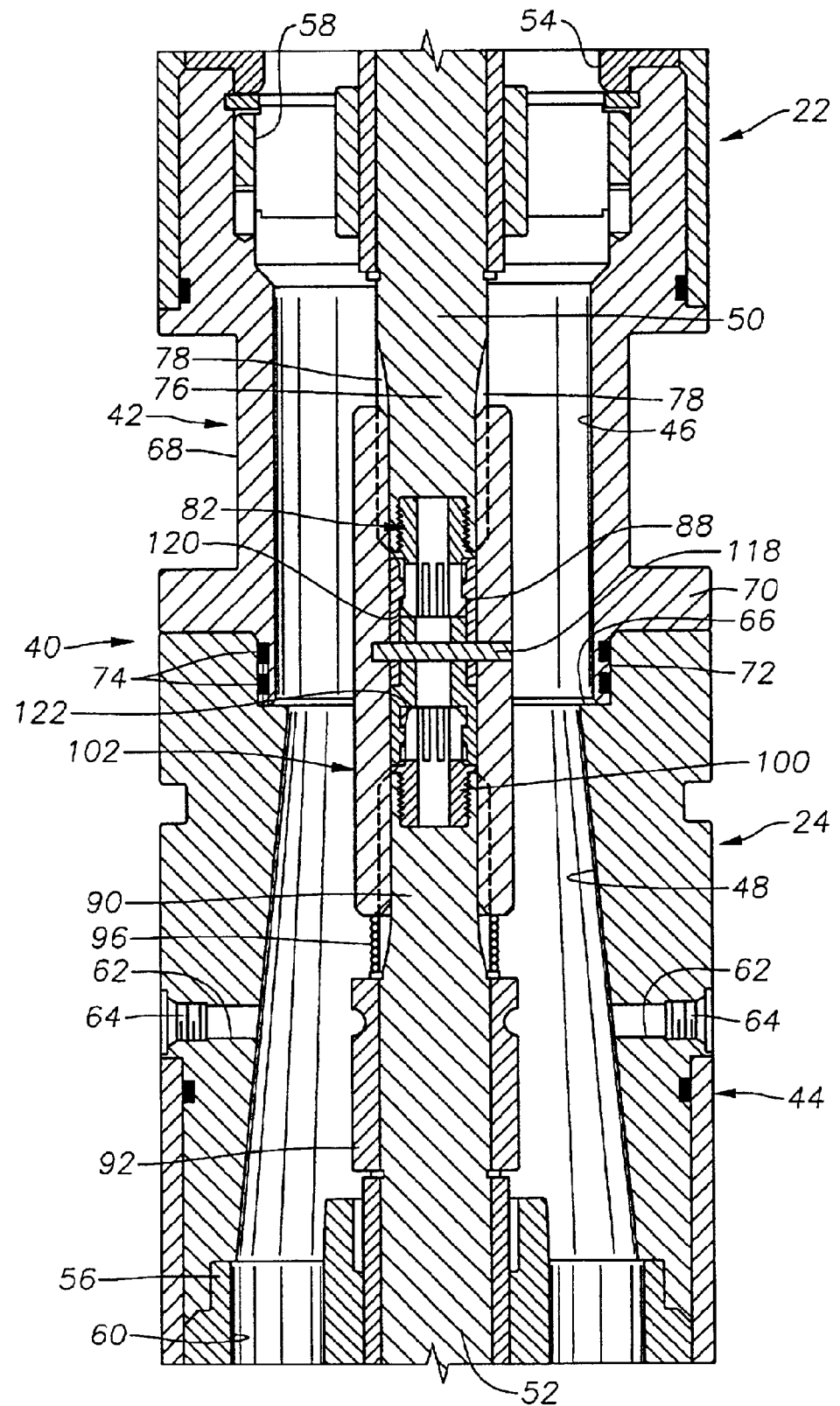
FIG. 4 is a side cross-sectional view of the components shown in FIGS. 2 and 3 with the pump components fully interconnected.

FIGS. 3 and 4 depict the assembly of an engaged interconnection of the two pump sections 22, 24 using the connection assembly 40. In FIG. 3, the upper and lower pump sections 22, 24 have been axially aligned with one another and moved toward engagement by disposing the coupling sleeve 102 between the two pump sections 22, 24, and the shaft ends 76, 90 are inserted into the opposite ends of the coupling sleeve 102. As a result, the splines 78 become engaged with splines 108 in the coupling sleeve 102 while the splines 94 are engaged with the splines 110 on the coupling sleeve 102. The upper pump housing 42 becomes securely seated upon the lower pump housing 44 as the seating portion 72 of the upper pump housing 42 is inserted into the landing shoulder 66 of the lower pump housing 44 (see FIG. 4). When this occurs, the elastomeric seals 74 are urged into sealing engagement with the shoulder 66. Engagement of the two pump sections 22, 24 is complete when the catches 88 of the latching members 82, 100 become rinterengaged with the respective annular shoulder 120, 122 within the coupling sleeve 102. The fingers 86 are deflected radially inwardly to permit this interengagement, which is typically accomplished in a snap-lock engagement manner.

The engagement of the pump section 22, 24 is secured in response to various types of loading. The engagement of the splines 78, 108 and 94, 110 permits rotational torque to be transmitted between the shaft members 50, 52. Compressive loads upon the outer housings 42, 44 are absorbed directly by the housings 42, 44 via the direct connection of the shoulder 66 and the seating portion 72. Compressive loading of the shaft members 50, 52 is borne by the abutting relation between the ends 76, 90 of the shafts 50, 52 and the coupling sleeve 102. Limited tensile loads, that is, tensile loading up to a predetermined amount, are also permissible and can be borne by the connection assembly 40. Specifically, the interengagement of the latching members 82, 100 with the first and second hub members 112, 114 will support such tensile loading. In currently preferred embodiments, the connection assembly 40 is designed to support tension loads up to a desired amount. The amount of this predetermined load will vary in accordance with the type of pump components used as well as the well conditions.

Figure 5:
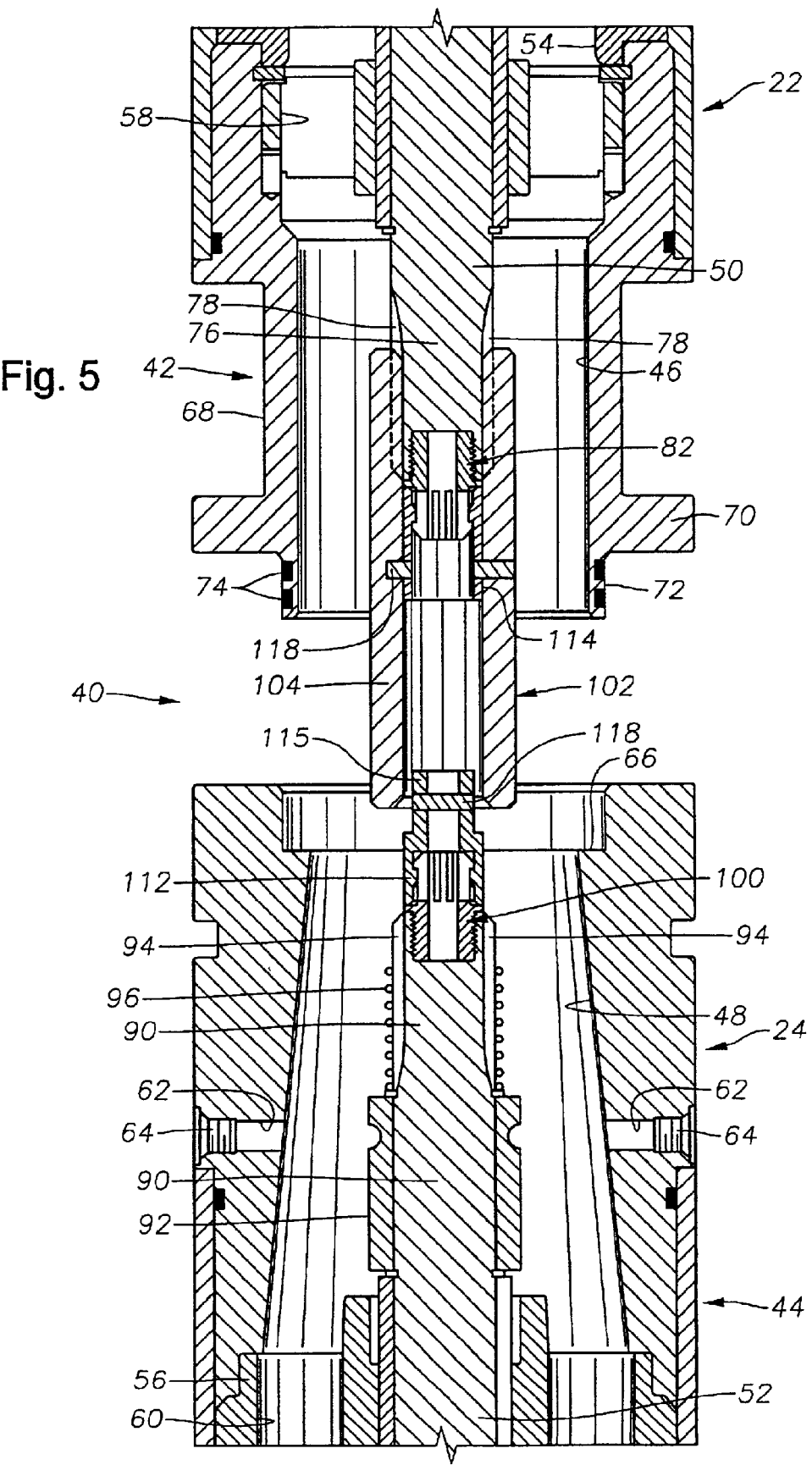
FIG. 5 is a side cross-sectional view of the components shown in FIGS. 2, 3 and 4 wherein the pump components have been separated.

The pump sections 22, 24 may be separated by applying a suitably high tensile load to the pump sections 22, 24 to separate them. A suitably high tensile load is one in excess of that required to shear the shear pin 118. This tensile loading is preferably applied once the ESP assembly 16 has been removed from the wellbore 10. Separation of the pump sections may be accomplished by clamping onto the lower pump section 24 and lifting up on the upper pump section 22 using a crane or other device able to generate sufficient pull to effect separation. When a predetermined excessive amount of tensile loading is applied to the shafts 50 and 52, the shear pin 118 ruptures, as is shown in FIG. 5, thereby permitting the first and second hub members 112, 114 to separate from one another. The first hub member 112 is retained upon the end 90 of the shaft 52 while the second hub member 82 and the coupling sleeve 102 are retained upon the end 76 of the shaft 50.

Figure 6:
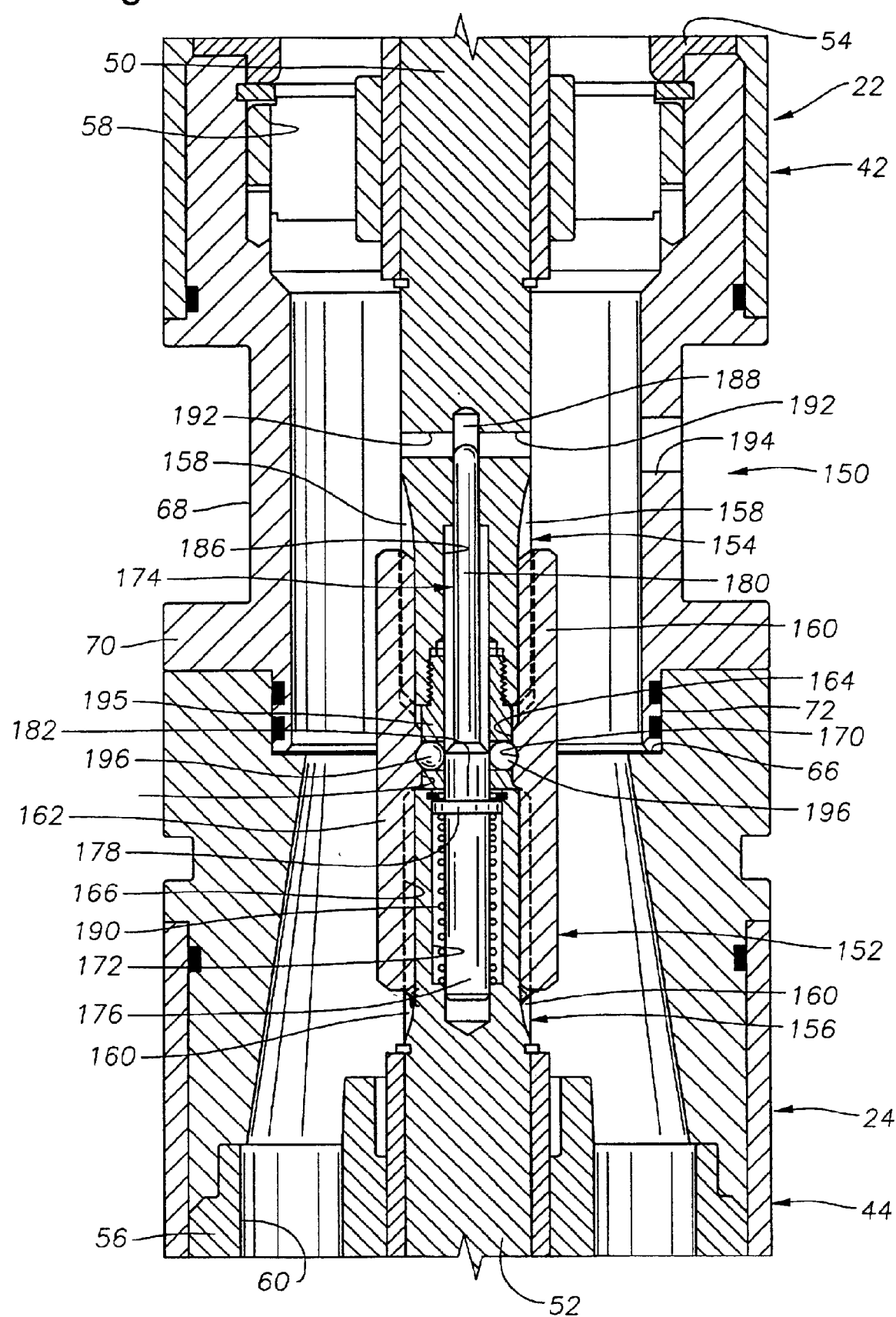
FIG. 6 is a side cross-sectional view of a second exemplary connection assembly used to interconnect the two pumps shown in FIG. 1. In this view, the pumps are fully interconnected.
Figure 7:
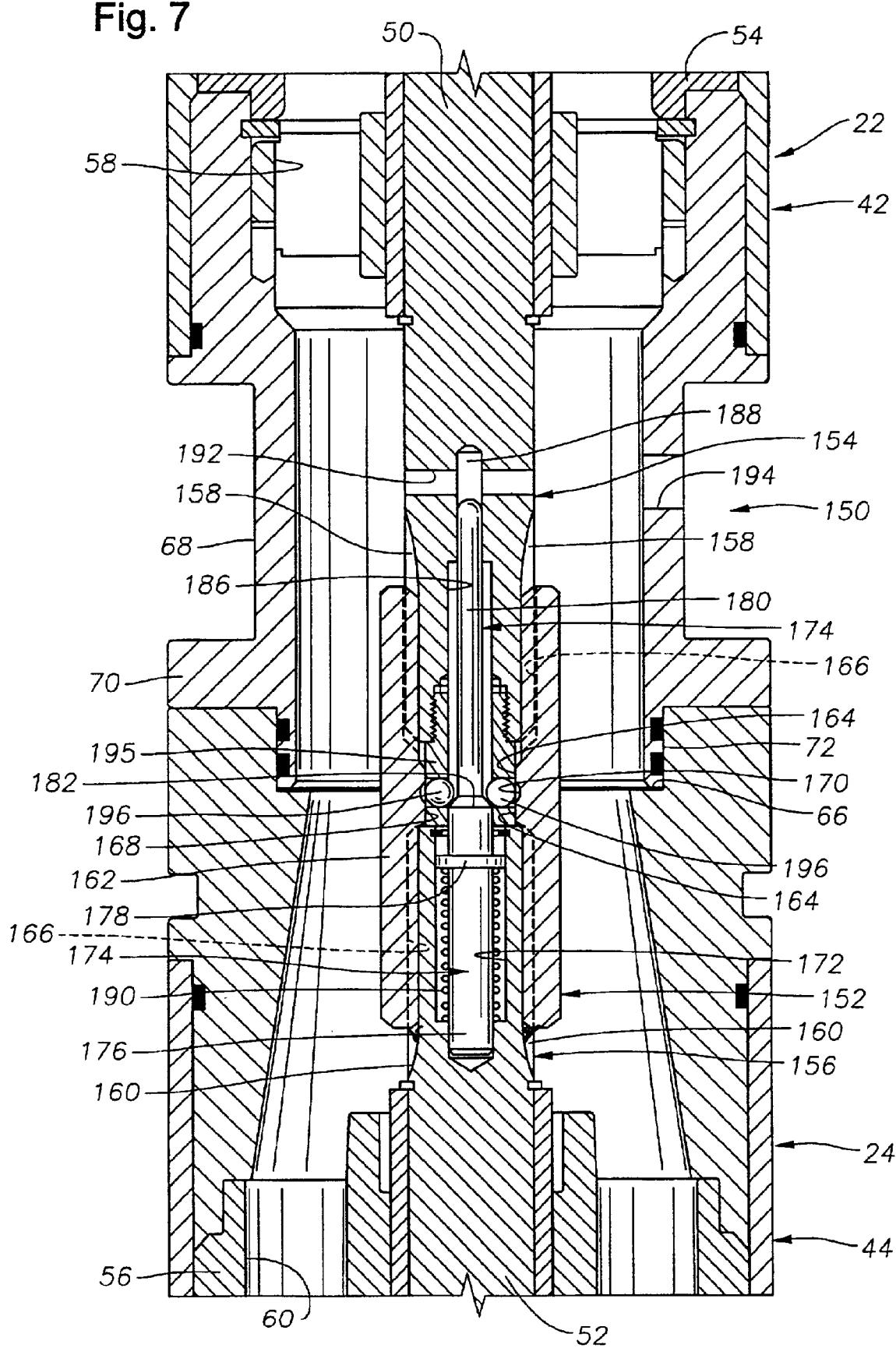
FIG. 7 is a side cross-sectional view of the connection assembly depicted in FIG. 6 with the release mechanism partially actuated.
Figure 8:
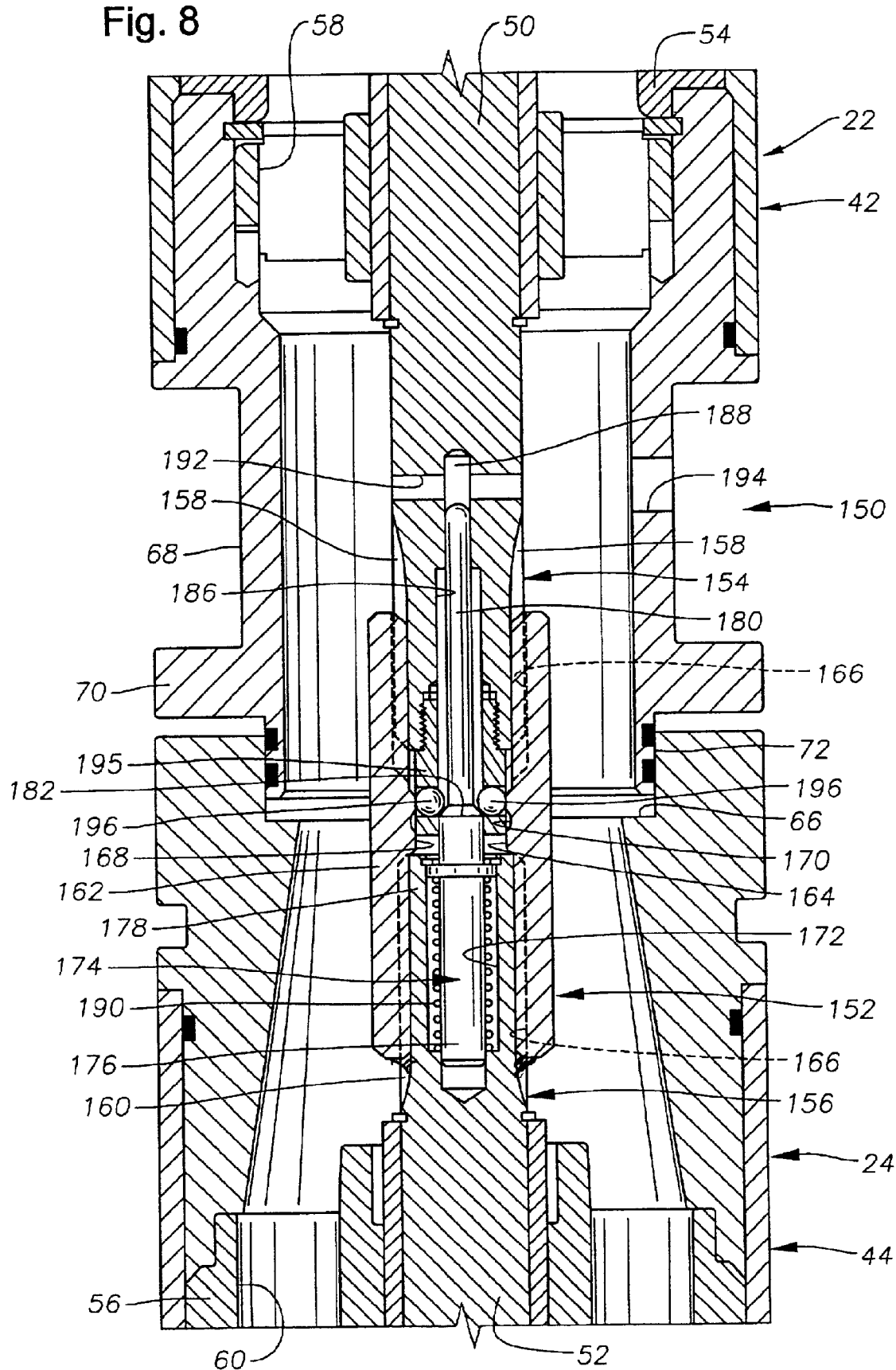
FIG. 8 is a side cross-sectional view of the connection assembly depicted in FIGS. 6 and 7 wherein the release mechanism is fully actuated.

Referring now to FIGS. 6, 7 and 8, there is shown an alternative embodiment for a connection assembly 150, which is constructed in accordance with the present invention and also shown interconnecting the two pump sections 22, 24. The structures of the components used as between the two embodiments are similar and, therefore, like reference numerals are used for like components. The primary differences as between the two embodiments are found in the longitudinal ends of the shaft members 50, 52 and the coupling sleeve 152 which is used in place of the coupling sleeve 102 described previously.

The connection assembly 150 includes the coupling sleeve 152 as well as the ends 154, 156 of respective shafts 50, 52, which are configured to be engaged with the coupling sleeve 152. The end 154 of shaft 50 features a plurality of radial exterior, longitudinal splines 158 that have the same construction as the splines 78 described earlier. The end 156 of shaft 52 also is provided with splines 160. In this embodiment, coupling sleeve 152 is affixed to shaft end 156, such as by welding.

The coupling sleeve 152 has a tubular body 162 that defines a central axial passageway 164 therein. The passageway 164 has radially inwardly-directed splines 166 at each end that are shaped and sized to interfit with the splines 158, 160 of the shaft ends 154, 156 in order to permit transmission of torsional forces across the shafts 50, 52 and the coupling sleeve 152. The axially central section 168 of the passageway 164 presents a reduced diameter and has an annular groove 170 inscribed within, which serves as an axial load transmitting shoulder.

The upper end 156 of the lower shaft member 52 has a blind bore-type lower chamber 172 that has been drilled in. A pin 174 is retained within the lower chamber 172 and axially moveable therein. The pin 174 features a base portion 176 with a enlarged annular flange 178 that projects radially outwardly. Above the base portion 176 is a reduced diameter portion 180. A tapered shoulder 182 is defined between the base portion 176 and the reduced diameter portion 180. The reduced diameter portion 180 extends upwardly into an upper chamber 186 and reduced diameter passage 188 that have been drilled into the end 154 of the shaft member 50. A compressible spring 190 is located in the lower chamber 172 and engages the flange 178 so that the pin 174 is urged upwardly. Laterally drilled access holes 192 interconnect the passage 188 to the exterior of the shaft 50. Access hole 194 is disposed through the housing 42 of the upper pump section 22.

A carrier 195 is threadedly secured within the lower end 154 of the shaft 50. A plurality of spherical locking balls 196 can be seen in FIG. 5 retained within carrier 195. The balls 196 also reside within the annular groove 170 of the passageway 164 while in the locked position. The balls 196 are retained within the groove 170 by the width of the enlarged base portion 176 of the pin 174. The balls 196 prevent carrier 195 from being withdrawn from the coupling sleeve 152.

The reduced diameter portion 180 of the pin 174 may be engaged at its upper end by a set screw, or other longitudinal member inserted through the access hole 194 in the housing 42 and one of the access holes 192 in the shaft 50.

In FIG. 6, the connection assembly 150 is shown in a fully engaged condition such that the shaft ends 154, 156 are securely affixed to the coupling sleeve 152. Shaft end 156 is permanently affixed to the coupling sleeve 152 by welding the splined portions together. FIG. 7 depicts the pin 174 after having been moved downwardly slightly by a set screw or other longitudinal member (not shown), thereby compressing the spring 190. In FIG. 7, the locking balls 196 are aligned with the tapered shoulder 182 or reduced diameter portion 180 of the pin 174 so that they may move radially inwardly out of the groove 170 of the coupling sleeve 152, thereby freeing the coupling sleeve 152 from the latching connection with the latching member 195. In FIG. 8, the pin 174 is shown returned by the spring 190 to its upward position. However, the locking balls 196 are no longer within the outwardly protruding groove 170 and the shaft 50 maybe drawn upwardly away from the shaft 52 and the coupling sleeve 152. It can be seen then that the locking balls 196 are moveable between a locked position wherein the balls 196 reside within the groove 170, thereby securing the shaft members 50, 52 together, and an unlocked position wherein the balls 196 are permitted to move inwardly from the groove 170, thereby permitting the shaft members 50, 52 to be drawn axially apart from one another.

Figure 9:
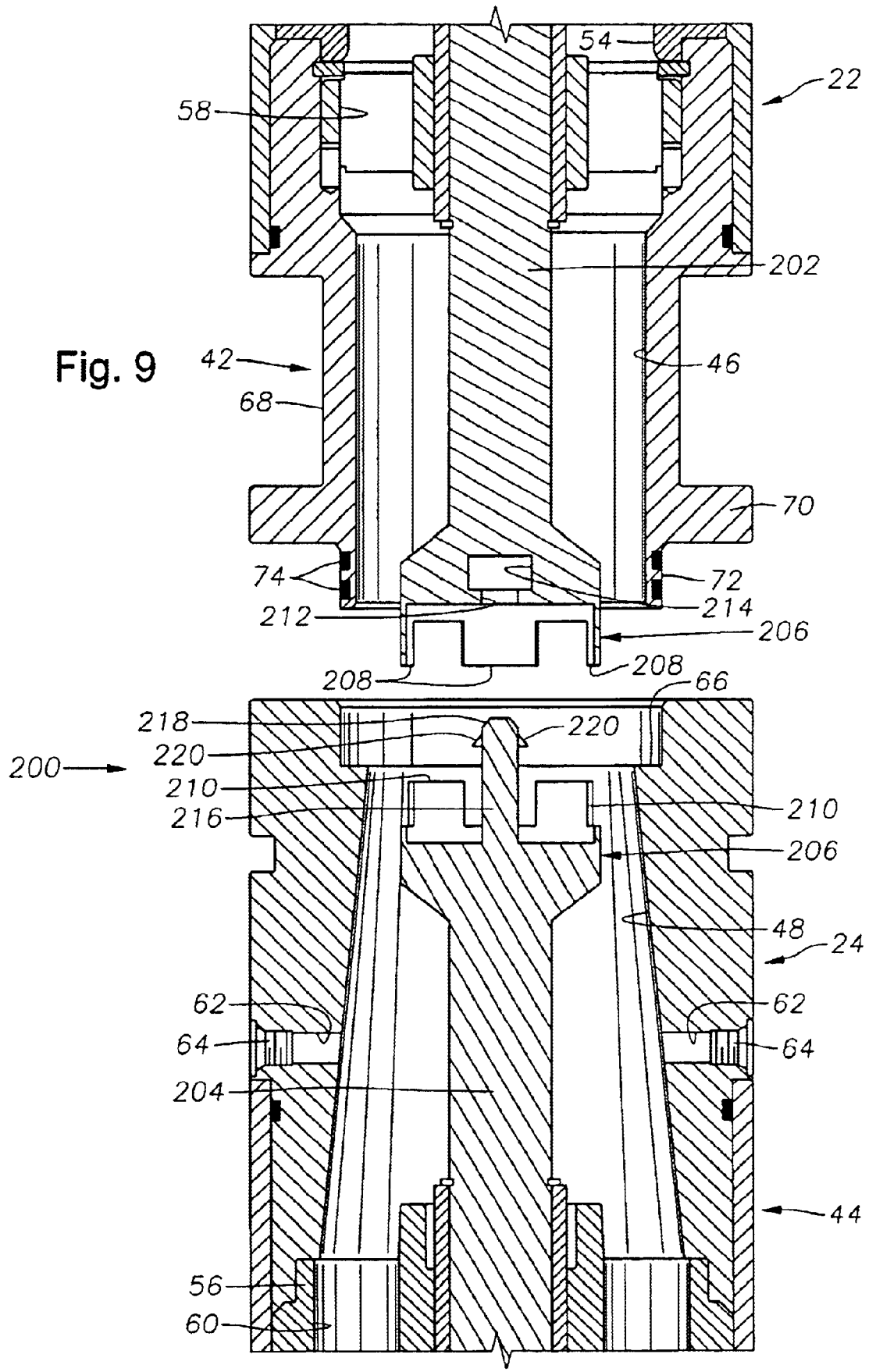
FIG. 9 is a side cross-sectional view of a third exemplary connection assembly that incorporates a connection for the shaft sections having a snap fastener with a crenelated torque transfer arrangement.
Figure 10:
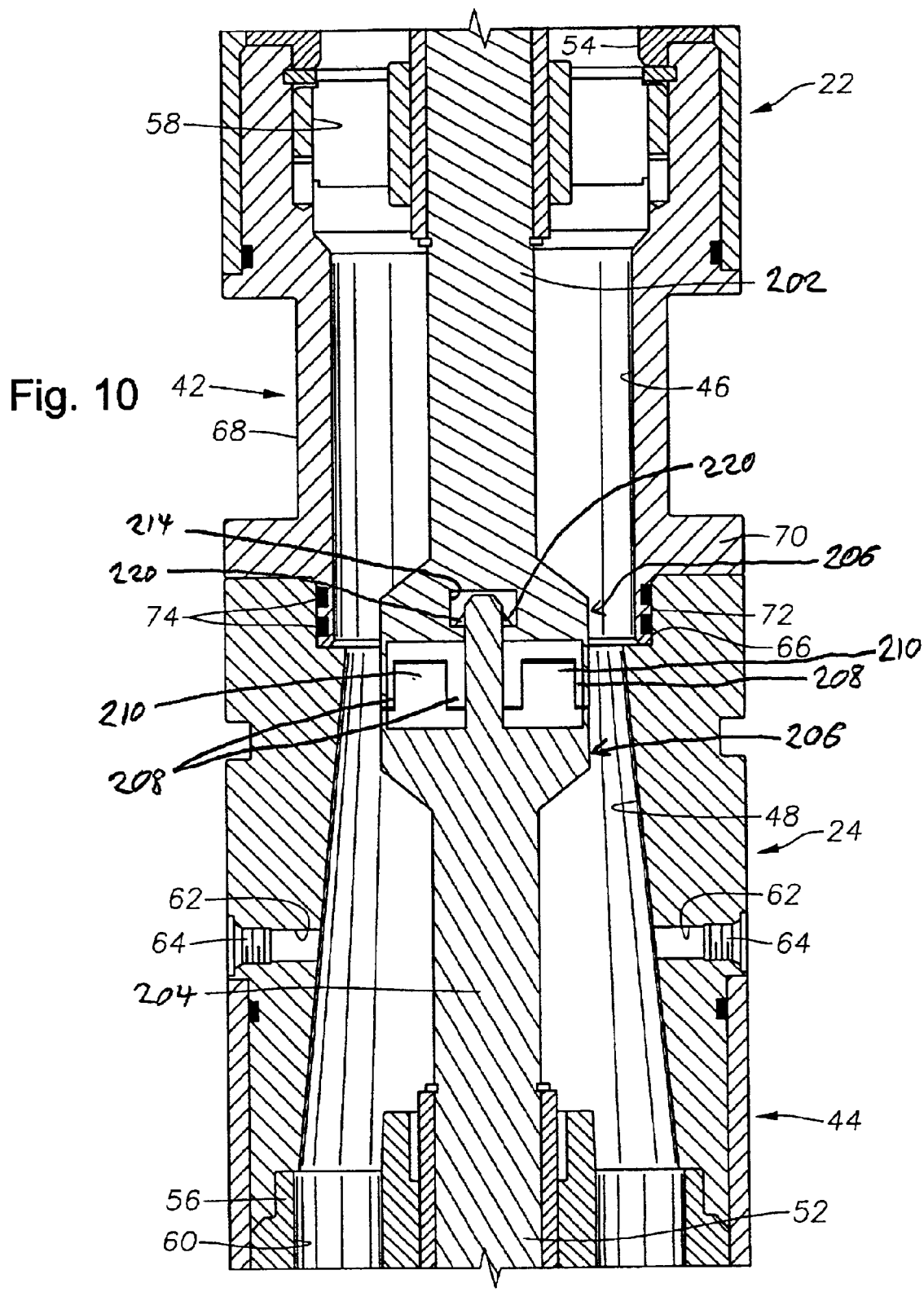
FIG. 10 is a side cross-sectional view of the connection assembly shown in FIG. 9 with the pump assemblies now interconnected with one another.

Referring now to FIGS. 9 and 10, a further exemplary embodiment for a connection assembly 200 constructed in accordance with the present invention. FIG. 9 shows two exemplary pump sections 22 and 24 apart from one another, while FIG. 10 shows the two pump sections 22, 24 interconnected with one another. The outer housing bodies 42 and 44 are constructed identically to the housing bodies 42, 44 described earlier. Thus, like reference numerals are used. The connection assembly 200 has an upper shaft member 202 and a lower shaft member 204. These shaft members have end portions 206 that are designed to interlock with one another so as to be fixed against rotation with respect to one another. As a result, the shaft end portions 206 are radially enlarged, and castellations or fingers 208, 210 project axially from the shaft end portions 206. The castellations 208 on shaft 202 are matingly engageable with the castellations 210 on shaft 204 so that, when engaged, the shafts 202, 204 are secured against rotation with respect to one another.

The shafts 202, 204 are also configured to be locked together as against tensional forces by moving the two shafts axially toward one another and urging them into a locking relation. The end portion 206 of the upper shaft 202 includes an axial neck 212 of narrow radius and an enlarged chamber 214 disposed immediately behind the neck 212. The end portion 206 of the lower shaft 204 has a reduced diameter rod 216 that is centrally located and extends axially outwardly. The distal end 218 of the rod 216 carries a number of spring-biased, tapered catches 220. The rod 216 is shaped and sized to fit within the neck 212 in a complimentary fashion. The catches 220 are spring biased in a radially outward position and can selectively withdraw radially into the rod 216 and be urged past the neck 212 where the spring-bias will cause them to radially expand. The catches 220 prevent the shafts 202, 204 from being drawn apart axially under tension. Thus, it can be seen that the shafts 202, 204 may be locked together axially and radially by being urged toward one another.

Figure 11:
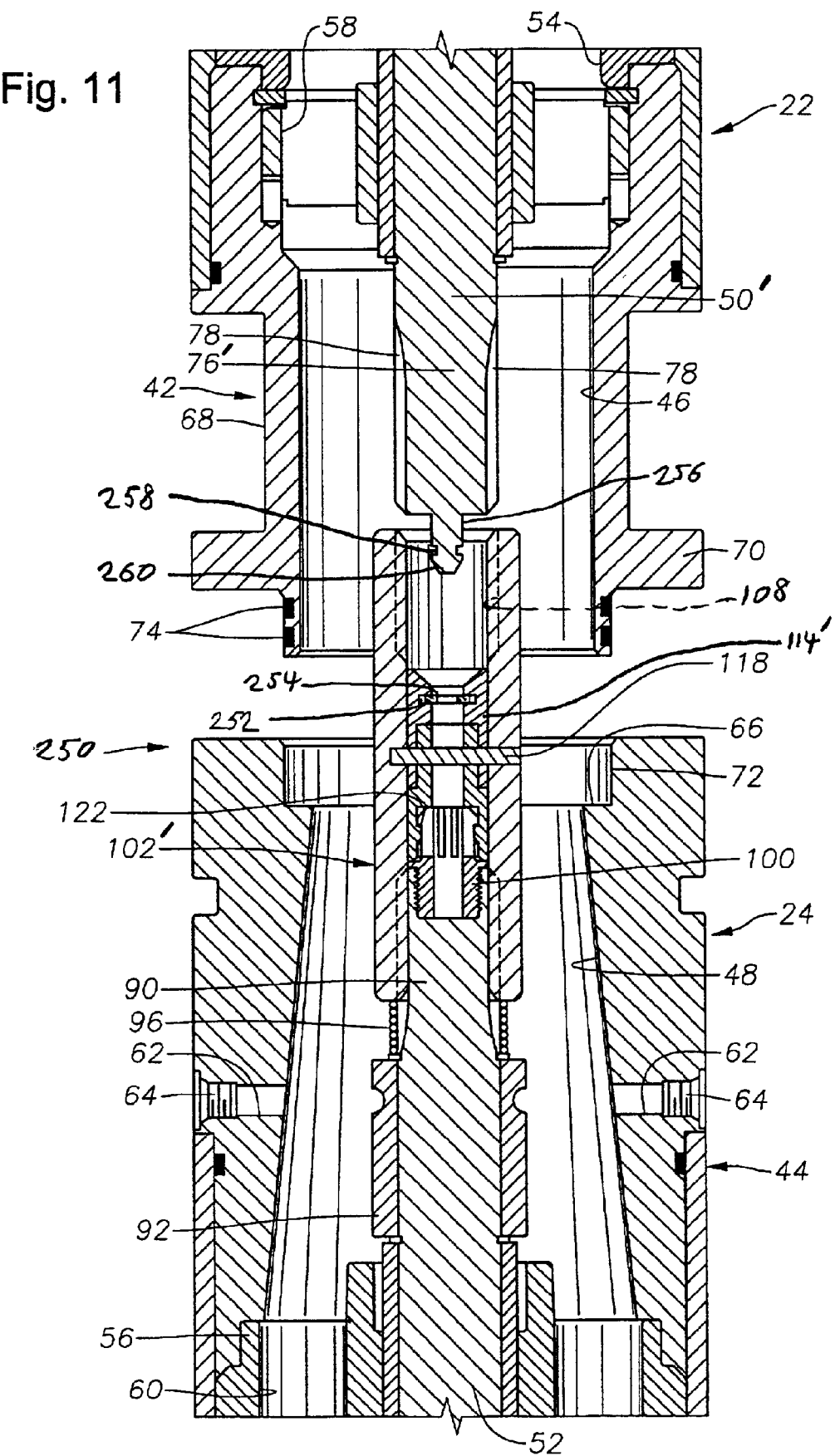
FIG. 11 is a side cross-sectional view of a fourth exemplary connection assembly that incorporates a split ring shaft connection arrangement.
Figure 12:
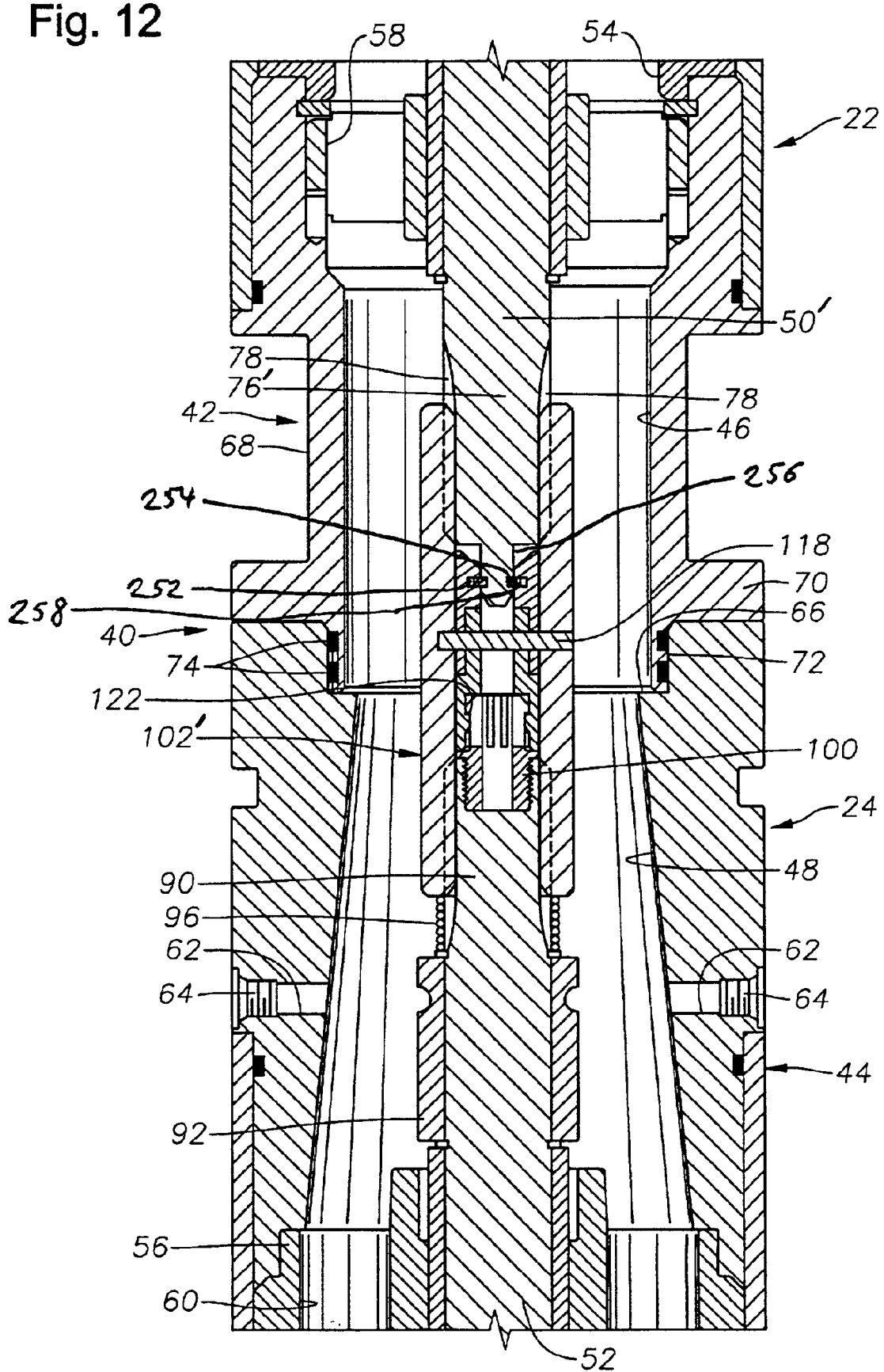
FIG. 12 is a side cross-sectional view of the connection assembly shown in FIG. 11 with the pump assemblies now interconnected with one another.

FIGS. 11 and 12 depict a further embodiment of the invention that is similar in many respects to the embodiment depicted in FIGS. 2 through 5. The connection assembly 250 is similar in many respects to the connection assembly 40 described earlier and depicted in FIGS. 2 through 5. Like components are given like references numerals. Unlike the connection assembly 40, the connection assembly 250 incorporates a split ring connection. Specifically, the second inner hub member 114' of the coupling sleeve 102' has been modified to provide an annular groove 252 that loosely retains a split ring 254 within. By virtue of being split, the split ring 254 is radially expandable under internal urging. The split ring 254 has shape memory so that the ring will return to its original shape after such urging.

The upper shaft member 50' of the connection assembly 250 no longer has latching member 82 affixed within its lower end portion 76'. Instead, a reduced diameter rod 256 protrudes axially from the lower end portion 76'. The distal end of the rod 256 has an annular recessed groove 258 that lies proximally from a tapered tip 260. Rod 256, groove 258 and split ring 254 serve as the axial load transmitting shoulder and latching member.

The upper shaft member 50' can be secured against axial and rotational movement with respect to the lower shaft member 52 by moving the two shaft members toward one another and causing the split ring connection to be made. The engagement of the splines 78, 108 will prevents rotation of the upper shaft member 50' with respect to the coupling sleeve 102'. When the upper shaft member 50' is moved downwardly into engagement with the coupling sleeve 102', the tapered tip 260 enters the split ring 254 and urges it to expand radially outwardly into the recess 252. Further downward movement of the upper shaft member 50' will bring the split ring 254 into alignment with the groove 258 of the inner hub member 114', as shown in FIG. 12. In this position, the shape memory causes the split ring 252 to retract to its original shape and partially reside within the annular groove 258 of the rod 256. As FIG. 12 illustrates, the split ring 252 also partially resides within the annular recess 252 of the inner hub member 114' effectively locking the upper shaft member 50' to the coupling sleeve 102'. The coupling sleeve 102 is secured to the lower shaft member 52 in a manner previously described. As a result, the split ring connection of the connection assembly 250 permits a snap together connection that locks the shaft members 50', 52, as well as the coupling sleeve 102', together rotationally and axially.

Figure 13:
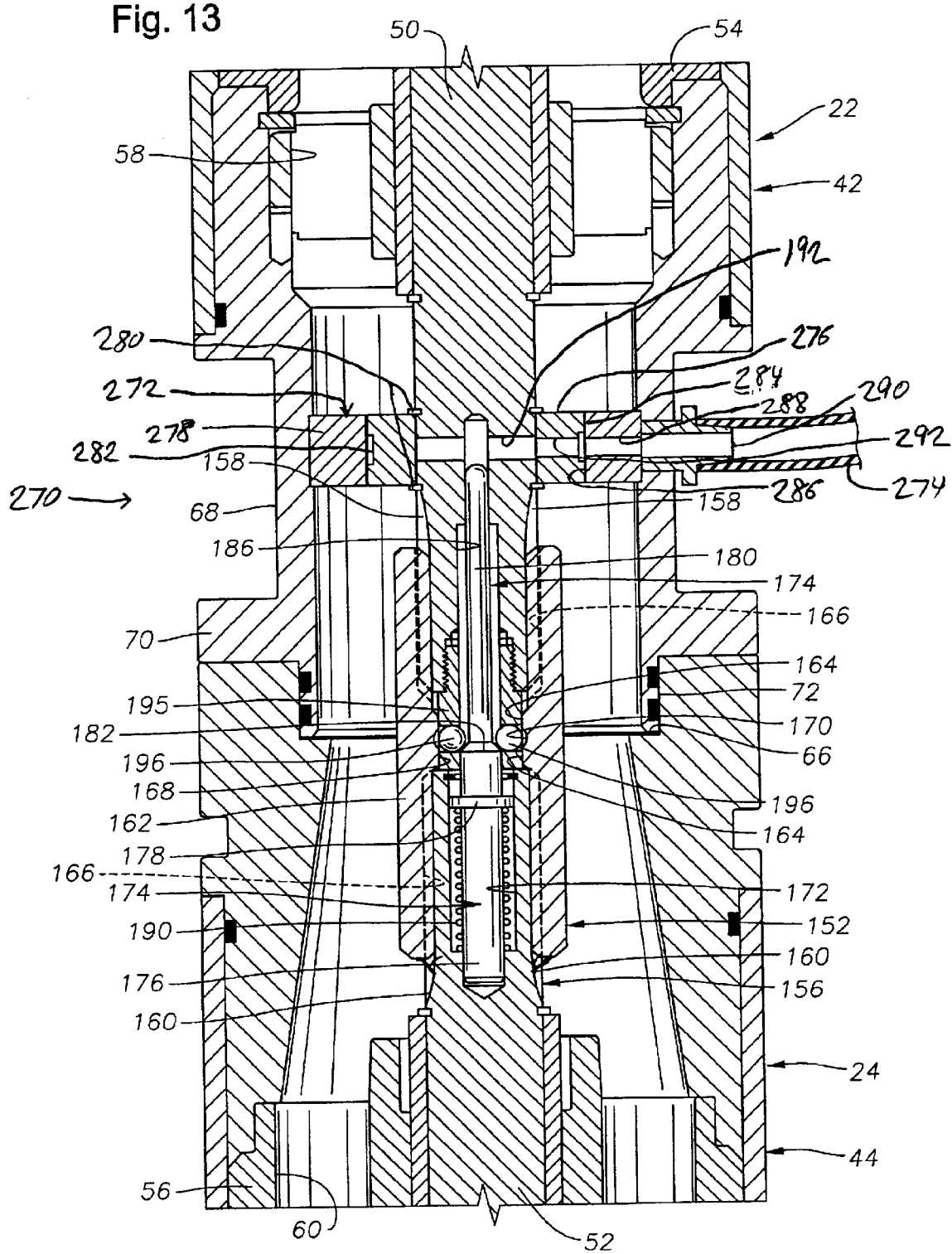
FIG. 13 is a side cross-sectional view of a fifth exemplary connection assembly having an arrangement for hydraulic disconnection of the pump assemblies.

Turning now to FIG. 13, a further exemplary embodiment of a connection assembly 270 is depicted which is similar in many respects to the connection assembly 150 described with respect to FIGS. 6–8. The connection assembly 270 is assembled in the same manner as the connection assembly 150, and the shaft members 50, 52 are secured axially and rotationally in the same manner in each embodiment. The connection assembly 270 differs from the connection assembly 150 in that the pin 174 is moved axially to free the coupling sleeve 152 and release the connection using fluid pressure. A fluid transfer assembly 272 is provided that permits pressurized fluid to be transmitted from hose 274 into passage 188. Fluid pressure within the hose 274 may be externally regulated and increased when desired to urge the pin 174 downwardly, thereby releasing the connection in the manner previously described.

The fluid transfer assembly 272 includes an inner annular member 276 and an outer annular member 278. The inner annular member 276 is securely affixed to the upper shaft member 50 using techniques known in the art, such as pinning. Locking rings 280 are used to assist securing of the inner annular member 276 to the shaft member 50. As a result of being secured to the shaft member 50, the inner annular member 276 will rotate with the shaft member 50 within the outer housing body 42. The outer annular member 278 is affixed in a secure manner to the outer housing body 42 and, thus, will not rotate as the shaft 50 rotates within the housing body 42. The inner annular member 276 has a circumferential groove 282 that is cut into the radially outer surface 284 of the inner annular member 276. The outer surface 284 of the inner annular member 276 is a bearing surface and engages the radially inner surface 286 of the outer annular member 278 in a substantially fluid-tight relation on either axial side of the groove 282. At the same time, however, the inner annular member 276 can rotate within the outer annular member 278.

It can be seen that the outer annular member 278 has a radial fluid communication port 288 that is aligned with the fitting 290 for the fluid transmitting hose 274. The inner annular member also has a radial fluid communication port 292 that can transmit fluid between the groove 282 and access hole 192 within the shaft member 50.

In operation, the shaft member 50 may be released from the coupling sleeve 152 by transmitting increased fluid pressure through the hose 274. Pressurized fluid is transmitted through the fitting 290 and the outer annular member 278 via fluid port 288 to the groove 282. From the groove 282, the fluid is communicated through the port 292 to the access hole 192 of the shaft member 50. Since the groove 282 is annular, the fluid residing within the groove 282 will always be able to find its way into the port 292 even if the shaft member 50 is rotating.

Figure 14:
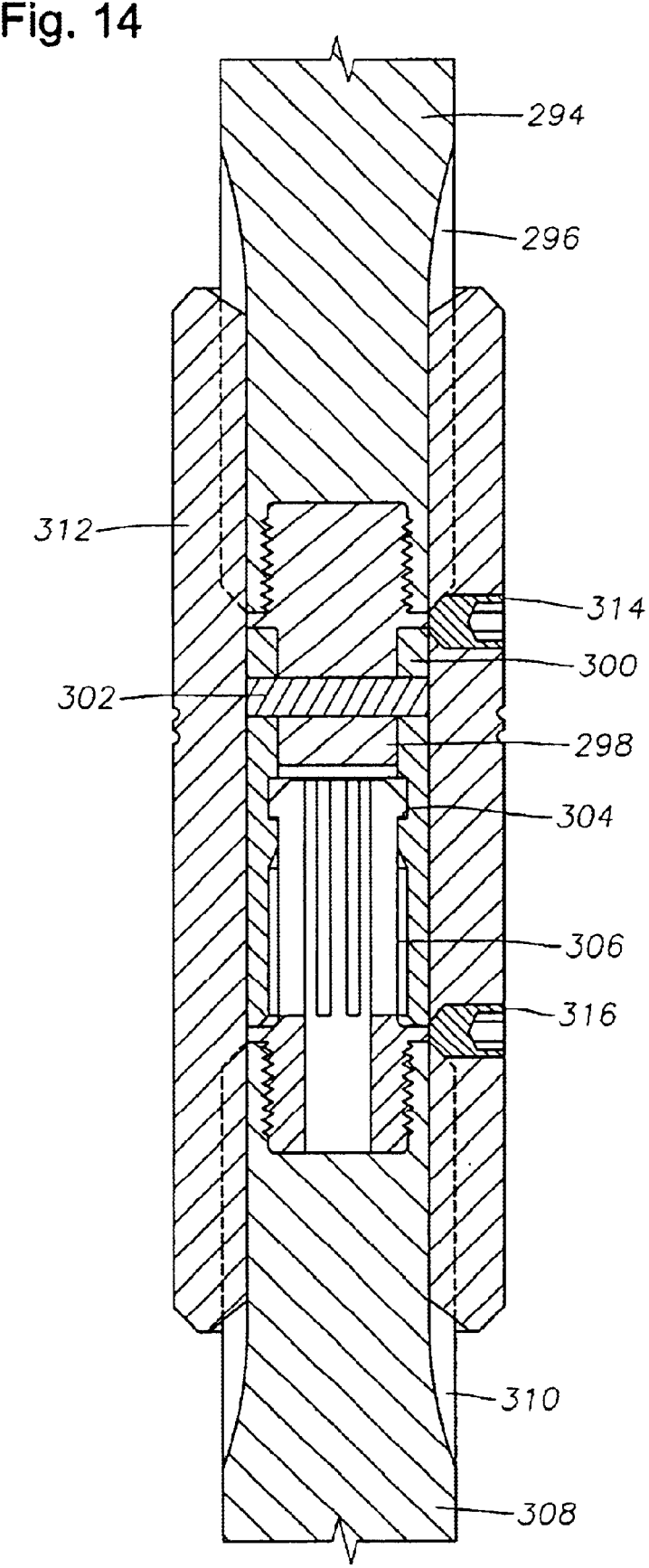
FIG. 14 is a side cross-sectional view of a sixth exemplary connection assembly.

In the embodiment of FIG. 14, shaft 294 has axial splines 296. A boss 298 is secured into a threaded hole in the end of shaft 294. Boss 298 is a cylindrical rod that may have an outer diameter less than the end of shaft 294. A tubular member or hub 300 slides over boss 298 and extends below. Hub 300 is secured to boss 298 by a shear pin 302 that extends transversely between them. Hub 300 has an internal axial load transmitting shoulder 304.

A latch member 306 is mounted to shaft 308. Latch member 306 is similar to latch member 82 of FIG. 2, having a plurality of inward-biased fingers, each having a catch that snaps over load shoulder 304. Bringing shafts 294 and 308 toward each other in straight axial movement causes latch member 306 to snap into engagement with load shoulder 304, locking shafts 294 and 308 together for transmitting axial tensile force.

A sleeve 312 is employed for transmitting radial forces between shafts 294 and 308. Sleeve 312 has internal splines that mesh with splines 310 of shaft 308 and splines 296 of shaft 294. Sleeve 312 need not be affixed to either of the shafts 294, 308 since it does not transmit tensile forces. Preferably, a stop device is employed to prevent sleeve 312 from sliding downward to the lower end of splines 310 of shaft 308, which is shown to be the lower shaft in the drawings. Shaft 294 could alternately be the lower shaft in a vertical application of the pump. A stop device may also be used to prevent sleeve 312 from sliding too far onto splines 296 of shaft 294, in the case the pump is operated horizontally. The stop devices could be snap rings, protuberances or other similar devices, and are shown is this embodiment to be set screws 314 or 316. Set screws 314, 316 protrude slightly into the bore of sleeve 312 and contact the ends of shafts 294, 308 to center sleeve 312 on shafts 294, 308. Set screws 314, 316 are preset prior to inserting sleeve 312 over shaft 204 or 308 and do not need to be tightened against either shaft 294 or 308.

The inventive methods and devices are advantageous in that they permit tensile loading of the components within an ESP assembly and, thus, permit construction and use of reverse, or inverted, assemblies wherein the pump section or sections are located downhole of the seal and motor sections. In some preferred embodiments, the inventive methods and devices also provide for selectively reversible interconnection of the pump component sections such that they may be readily separated when desired. Separation may be accomplished by, for example, shearing a frangible member, such as shear pin 118, or by axially moving a pin, such as pin 174.

While described in terms of its preferred embodiments, those of skill in the art will understand that many modifications and changes may be made while remaining within the scope of the invention.

What is claimed is:

1. A submersible pump assembly, comprising:
   first and second modules that connect together, each of the modules having a central shaft and an outer housing;
   a first shaft end on the shaft within the first module;
   a second shaft end on the shaft within the second module; and
   a latch assembly having non-threaded mating portions on each of the shaft ends that latch the first and second shaft ends together when the shaft ends and housings are brought into engagement with each other with straight axial movement, the latch assembly transmitting axial tensile forces from one of the shafts to the other and transmitting torque from one of the shafts to the other.

2. The submersible pump according to claim 1, wherein the latch assembly comprises:
   a set of external splines on each shaft end;
   a sleeve that has internal splines that slide into engagement with the external splines of both shaft ends to transmit torque;
   a latch member mounted to one of the shaft ends; and
   a load shoulder carried by the other of the shafts, the latch member snapping into engagement with the load shoulder upon straight axial movement of the shaft ends toward each other.

3. The submersible pump according to claim 1, wherein the latch assembly comprises:
   a set of external splines on each shaft end;
   a sleeve that has internal splines that slide into engagement with the external splines of both shaft ends to transmit torque;
   a latch member mounted to one of the shaft ends;
   a load shoulder member mounted within the sleeve, the latch member having a biased resilient retainer that snaps into engagement with the load shoulder member; and
   a pin that extends transversely through the load shoulder member and the sleeve to retain the load shoulder member with the sleeve.

4. The submersible pump according to claim 1, wherein the latch assembly comprises:
   a set of external splines on each shaft end;
   a sleeve that has internal splines that slide into engagement with the external splines of both shaft ends to transmit torque, the sleeve having an internal annular recess;
   a radially movable locking member mounted to one of the shafts for moving radially into and out of engagement with the recess; and
   an actuator axially carried within the other of the shafts in engagement with the locking member, the actuator being axially movable between a locked position pushing the locking member radially into engagement with the recess in the sleeve and a released position, allowing the locking member to retract out of engagement with the sleeve, the actuator being axially biased to the locked position.

5. The submersible pump according to claim 4, further comprising an access port extending through one of the shafts at an end of the actuator for providing access to push the actuator to the released position.

6. The submersible pump according to claim 4, further comprising:
   an access port extending through one of the shafts at an end of the actuator; and
   an annular manifold mounted between the housing and the shaft at the access port;
   an inlet port leading through the housing to the manifold for applying fluid pressure to push the actuator to the released position.

7. The submersible pump according to claim 1, wherein the latch assembly comprises:
   a set of castellations on each of the shaft ends for meshing engagement with each other to transmit torque;
   a load shoulder carried by one of the shaft ends; and
   a resilient retainer carried by the other of the shaft ends that snaps into engagement with the load shoulder when the shaft ends are brought into engagement with each other.

8. The submersible pump according to claim 1, wherein the latch assembly comprises:
   a set of external splines on each shaft end;
   a sleeve that has internal splines that slide into engagement with the external splines of both shaft ends to transmit torque;
   a latch member mounted to one of the shift ends, the latch member having a biased resilient retainer;
   a tubular load shoulder member mounted to the other of the shaft ends for receiving the latch member, the load shoulder member having an internal shoulder that is engaged by the retainer; and
   a shear member that secures the load shoulder member to the other of the shaft ends that is sheared by an excessive tensile force to release the shaft ends from each other.

9. An electrical submersible pump assembly comprising:
   first and second modular component sections, each of the sections having an outer housing and an inner shaft member;
   a coupling sleeve having a bore and disposed between the modular component sections and receiving therein the shaft member of each of the component sections, the bore of the coupling sleeve and the shaft members having mating radial load transmitting shoulders for transmitting torque;
   an axial load transmitting shoulder affixed to the shaft member of the first modular component section and located in the bore of the coupling sleeve; and
   a latch member carried by the shaft member of the second modular section that moves into non-threaded engagement with the axial load transmitting shoulder to secure the shaft members to one another for transferring axial tension from one of the shaft members to the other.

10. The assembly of claim 9 wherein the outer housings of the component sections are in an abutting relation for the transmittal of axially compressive forces.

11. The assembly of claim 9 wherein the latch member comprises:
a plurality of axially extending fingers with catches that are shaped and sized to engage the axial load transmitting shoulder.

12. The assembly of claim 9 further comprising a hub member within the bore of the sleeve, the axial load transmitting shoulder being formed on the hub member; and
a shear member that retains the hub member to the shaft member of the first modular section, the shear member shearing upon sufficient tensile overpull to release the shaft members from each other.

13. The assembly of claim 9 wherein the latch member comprises a plurality of spherical locking balls that are selectively moveable into and out of a locked position with the axial load transmitting shoulder.

14. The assembly of claim 13 wherein the latch member further comprises an actuator disposed within one of the shaft members and axially moveable therein, the actuator being associated with the locking balls to move the balls out of the locked position when the actuator is moved axially.

15. The assembly of claim 14 wherein the actuator is axially biased toward a position wherein the locking balls are in the locked position.

16. The assembly of claim 9 wherein the load transmitting shoulder comprises:
a biased resilient retainer ring carried within a groove in the bore of the coupling sleeve; and the latch member comprises:
a rod having an external ledge thereon that is engaged by the retainer ring as the rod enters the retainer ring.

17. A connection assembly for a pair of submersible pump modules, each having a central shaft and an outer housing, the connection assembly comprising:
a first shaft end having at least one radial drive shoulder thereupon;
a second shaft end having at least one radial drive shoulder thereupon; and
a coupling sleeve having a bore and a radial drive shoulder within the bore that meshes with the radial drive shoulders of the first and second shaft ends to transmit torque;
a hub located within the bore, the hub having a passage with an axial load transmitting shoulder therein, the hub being affixed to the first shaft end; and
a latching member affixed to the second shaft end, the latching member snapping into engagement with the axial load transmitting shoulder when the shaft ends are moved into engagement with each other.

18. The connection assembly of claim 17 further comprising a shear member that connects the hub with the first shaft end, wherein the latching member is selectively released by applying an excessive amount of divergent tension to the shaft ends to shear the shear member.

19. The connection assembly of claim 17 wherein the latching member has a resiliently biased retainer portion that engages the axial load transmitting shoulder.

20. The connection assembly of claim 17, further comprising:
a boss on the first shaft end, the hub sliding over the boss; and
a shear pin extending transversely through the boss and the hub, thereby affixing the hub to the first shaft end.

21. The connection assembly of claim 19, wherein the retainer portion of the latching member comprises a plurality of axially extending fingers with catches that are shaped and sized to engage the axial load transmitting shoulder.

22. A method of releasably connecting an adjacent pair of modular component sections within a pump assembly, each of the sections having a shaft and an outer housing member, the method comprising:
providing a latch assembly having non-threaded mating portions on each of the shaft ends;
bringing the shafts of each of the component sections toward each other in straight axial movement, causing the mating portions of the latch assembly to latch into engagement with each other;
transmitting torque through the latch assembly; and
transmitting axial tensile forces from one of the shafts to the other through the latch assembly.

* * * * *